US008154516B2

(12) United States Patent
Wu

(10) Patent No.: US 8,154,516 B2
(45) Date of Patent: Apr. 10, 2012

(54) MULTI-FUNCTION WHEEL MOUSE WITH TWO SCROLL WHEELS

(75) Inventor: Chun-Che Wu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 653 days.

(21) Appl. No.: 12/325,479

(22) Filed: Dec. 1, 2008

(65) Prior Publication Data
US 2010/0085306 A1  Apr. 8, 2010

(30) Foreign Application Priority Data
Oct. 3, 2008 (TW) .............................. 97138039 A

(51) Int. Cl.
*G06F 3/033* (2006.01)
(52) U.S. Cl. ........................................ 345/163
(58) Field of Classification Search ........... 345/156–169
See application file for complete search history.

(56) References Cited

U.S. PATENT DOCUMENTS

| | | | | |
|---|---|---|---|---|
| 6,724,365 | B1 * | 4/2004 | Escamilla et al. ............ | 345/157 |
| 2004/0189605 | A1 * | 9/2004 | Shih .............................. | 345/163 |
| 2005/0231463 | A1 * | 10/2005 | Yang ............................ | 345/156 |
| 2007/0152970 | A1 * | 7/2007 | Chen et al. ................... | 345/163 |
| 2008/0001920 | A1 * | 1/2008 | Namiki ........................ | 345/163 |

* cited by examiner

*Primary Examiner* — Chanh Nguyen
*Assistant Examiner* — Tsegaye Seyoum
(74) *Attorney, Agent, or Firm* — Kirton & McConkie; Evan R. Witt

(57) ABSTRACT

A wheel mouse includes a first scroll wheel, a second scroll wheel, a first encoder, a second encoder and a control unit. The first encoder generates a first rotation signal according to the rotating condition of the first scroll wheel. The second encoder generates a second rotation signal according to the rotating condition of the second scroll wheel. The control unit is electrically connected to the first encoder and the second encoder for executing a corresponding function in response to the first rotation signal and the second rotation signal. The control unit executes a first function when only the first rotation signal is generated. The control unit executes a second function when only the second rotation signal is generated. The control unit executes a third function when the first rotation signal and the second rotation signal are simultaneously generated.

25 Claims, 4 Drawing Sheets

MULTI-FUNCTION WHEEL MOUSE WITH TWO SCROLL WHEELS

FIELD OF THE INVENTION

The present invention relates to a mouse, and more particularly to a tilt wheel type mouse.

BACKGROUND OF THE INVENTION

A mouse device is an important bridge between a computer system and a user. In addition to the basic functions of controlling cursor movement, the mouse device is developed to execute extended functions.

For example, by rotating a scroll wheel of the mouse device forwardly or backwardly, a specified control signal is generated to control the vertical scroll movement of web pages. In addition to the vertical scroll movement, it is important to achieve the horizontal scroll movement. Since the texts or graphs shown in the graphic-based window of the display screen usually fail to be fully browsed, the horizontal scroll movement is required to move the web page or document in the left or right direction so as to display the desired image. Since the scroll wheel assembly of a conventional mouse device permits for single axial rotation, the image shown on the screen of the computer system may be vertically scrolled. For horizontally moving the web page or document shown on the screen by operating the scroll wheel, the left click button of the mouse device should be continuously pressed down and tilted in the horizontal direction. Since the single axial rotation of the mouse device is unsatisfactory for horizontal scroll movement, a tilt wheel assembly is developed for controlling horizontal scroll movement of the image shown on the computer screen.

Referring to FIG. 1, a schematic perspective view of a conventional tilt wheel type mouse is illustrated. The tilt wheel type mouse 1 includes a tilt wheel assembly 11. The tilt wheel assembly 11 can be rotated in a first axial direction 12 such that the image shown on the computer screen moves upwardly or downwardly (i.e. in the vertical direction). Moreover, the tilt wheel assembly 11 can be rotated in a second axial direction 13 such that the image shown on the computer screen moves leftwards or rightwards (i.e. in the horizontal direction). The arrangement of the tilt wheel assembly 11 is convenient for browsing documents or web pages.

As previously described, the tilt wheel assembly 11 of the tilt wheel type mouse 1 can be rotated upwardly and downwardly in the first axial direction 12, tilted toward the left or right side in the second axial direction 13. In addition, the tilt wheel assembly 11 can be pressed down to execute a corresponding function. In other words, the typical tilt wheel type mouse is capable of executing five functions. Nowadays, the tilt wheel type mouse with five functions is not satisfied to meet the users' requirements. For expanding the functions of the tilt wheel type mouse, an additional hot key is mounted on the housing of the mouse. For integrating the hot key into the housing, a new mold of the housing should be design and made. The process of designing and making the new mold of the housing increasing the cost of the mouse. The housing having the additional hot key is not aesthetically pleasing.

Therefore, there is a need of providing a wheel mouse with multi-functions and low cost so as to obviate the drawbacks encountered from the prior art.

SUMMARY OF THE INVENTION

It is an object of the present invention to provide a wheel mouse having two tilt scroll wheels.

In accordance with an aspect of the present invention, there is provided a wheel mouse. The wheel mouse includes a first scroll wheel, a second scroll wheel, a first encoder, a second encoder and a control unit. The first encoder is disposed within the first scroll wheel and generates a first rotation signal according to the rotating condition of the first scroll wheel. The second encoder is disposed within the second scroll wheel and generates a second rotation signal according to the rotating condition of the second scroll wheel. The control unit is electrically connected to the first encoder and the second encoder for executing a corresponding function in response to the first rotation signal and the second rotation signal. The control unit executes a first function when only the first rotation signal is generated. The control unit executes a second function when only the second rotation signal is generated. The control unit executes a third function when the first rotation signal and the second rotation signal are simultaneously generated.

In an embodiment, the wheel mouse further includes a base, a supporting frame and a wheel swing seat. The base includes a gliding slot, a pillar and a fixing element. The supporting frame is mounted on the base, and includes a triggering part. The wheel swing seat is disposed on the supporting frame. The first scroll wheel, a second scroll wheel, a first encoder and a second encoder are accommodated in the wheel swing seat.

In an embodiment, the wheel mouse further includes a first switch arranged on the base. When the supporting frame is pushed downwardly, the triggering part of the supporting frame touches the first switch to generate a wheel triggering signal. In response to the wheel triggering signal, the control unit executes a fourth function.

In an embodiment, the fourth function is a normal-speed scrolling/high-speed scrolling switching function.

In an embodiment, the wheel mouse further includes a spring arranged between the supporting frame and the base. If the first scroll wheel and the second scroll wheel are not pressed down, the spring is sustained against the supporting frame but the triggering part of the supporting frame is not contacted with the first switch.

In an embodiment, the supporting frame is fixed by the gliding slot and the fixing element of the base. The supporting frame has a protrusion inserted into the gliding slot of the base such that the supporting frame is movable along the gliding slot.

In an embodiment, the wheel mouse further includes a second switch disposed on the pillar of the base. The second switch is screwed in the pillar.

In an embodiment, the wheel swing seat further includes a triggering arm. A tilt control signal is generated when the second switch is touched by the triggering arm. In response to the tilt control signal, the control unit executes a fifth function.

In an embodiment, the fifth function is a "Page Up function", or the fifth function is a "Backward" function under execution of Internet Explorer (IE) software.

In an embodiment, the wheel swing seat further includes a third switch disposed on the pillar of the base. The third switch is screwed in the pillar.

In an embodiment, the wheel swing seat further includes an additional triggering arm. An additional tilt control signal is generated when the third switch is touched by the additional triggering arm. In response to the additional tilt control signal, the control unit executes a sixth function.

In an embodiment, the sixth function is a "Page Down" function, or the sixth function is a "Forward" function under execution of Internet Explorer (IE) software.

In an embodiment, the first function is a vertical scrolling function, the second function is a horizontal scrolling function, and the third function is a high-speed vertical scrolling function.

In an embodiment, the second function is a horizontal scrolling function, the second function is a vertical scrolling function, and the third function is a high-speed horizontal scrolling function.

In accordance with another aspect of the present invention, there is provided a wheel mouse. The wheel mouse includes a first scroll wheel, a second scroll wheel, a first encoder, a second encoder, a base, a supporting frame, a wheel swing seat and a control unit. The first encoder is disposed within the first scroll wheel and generates a first rotation signal according to the rotating condition of the first scroll wheel. The second encoder is disposed within the second scroll wheel and generates a second rotation signal according to the rotating condition of the second scroll wheel. The base includes a gliding slot, a pillar and a fixing element. The supporting frame is mounted on the base, and includes a triggering part. The wheel swing seat is disposed on the supporting frame. The first scroll wheel, a second scroll wheel, a first encoder and a second encoder are accommodated in the wheel swing seat. The control unit is electrically connected to the first encoder and the second encoder for executing a corresponding function in response to the first rotation signal and the second rotation signal. The control unit executes a vertical scrolling function when only the first rotation signal is generated. The control unit executes a horizontal scrolling function when only the second rotation signal is generated. The control unit executes a high-speed vertical scrolling function when the first rotation signal and the second rotation signal are simultaneously generated.

In an embodiment, the wheel mouse further includes a first switch arranged on the base. When the supporting frame is pushed downwardly, the triggering part of the supporting frame touches the first switch to generate a wheel triggering signal. In response to the wheel triggering signal, the control unit executes a fourth function.

In an embodiment, the fourth function is a normal-speed scrolling/high-speed scrolling switching function.

In an embodiment, the wheel mouse further includes a spring arranged between the supporting frame and the base. If the first scroll wheel and the second scroll wheel are not pressed down, the spring is sustained against the supporting frame but the triggering part of the supporting frame is not contacted with the first switch.

In an embodiment, the supporting frame is fixed by the gliding slot and the fixing element of the base. The supporting frame has a protrusion inserted into the gliding slot of the base such that the supporting frame is movable along the gliding slot.

In an embodiment, the wheel mouse further includes a second switch disposed on the pillar of the base. The second switch is screwed in the pillar.

In an embodiment, the wheel swing seat further includes a triggering arm. A tilt control signal is generated when the second switch is touched by the triggering arm. In response to the tilt control signal, the control unit executes a fifth function.

In an embodiment, the fifth function is a "Page Up" function, or the fifth function is a "Backward" function under execution of Internet Explorer (IE) software.

In an embodiment, the wheel swing seat further includes a third switch disposed on the pillar of the base. The third switch is screwed in the pillar.

In an embodiment, the wheel swing seat further comprises an additional triggering arm. An additional tilt control signal is generated when the third switch is touched by the additional triggering arm. In response to the additional tilt control signal, the control unit executes a sixth function.

In an embodiment, the sixth function is a "Page Down" function, or the sixth function is a "Forward" function under execution of Internet Explorer (IE) software.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention provides a wheel mouse having two tilt scroll wheels. The additional scroll wheel can expand the function of the mouse.

Figure 1:
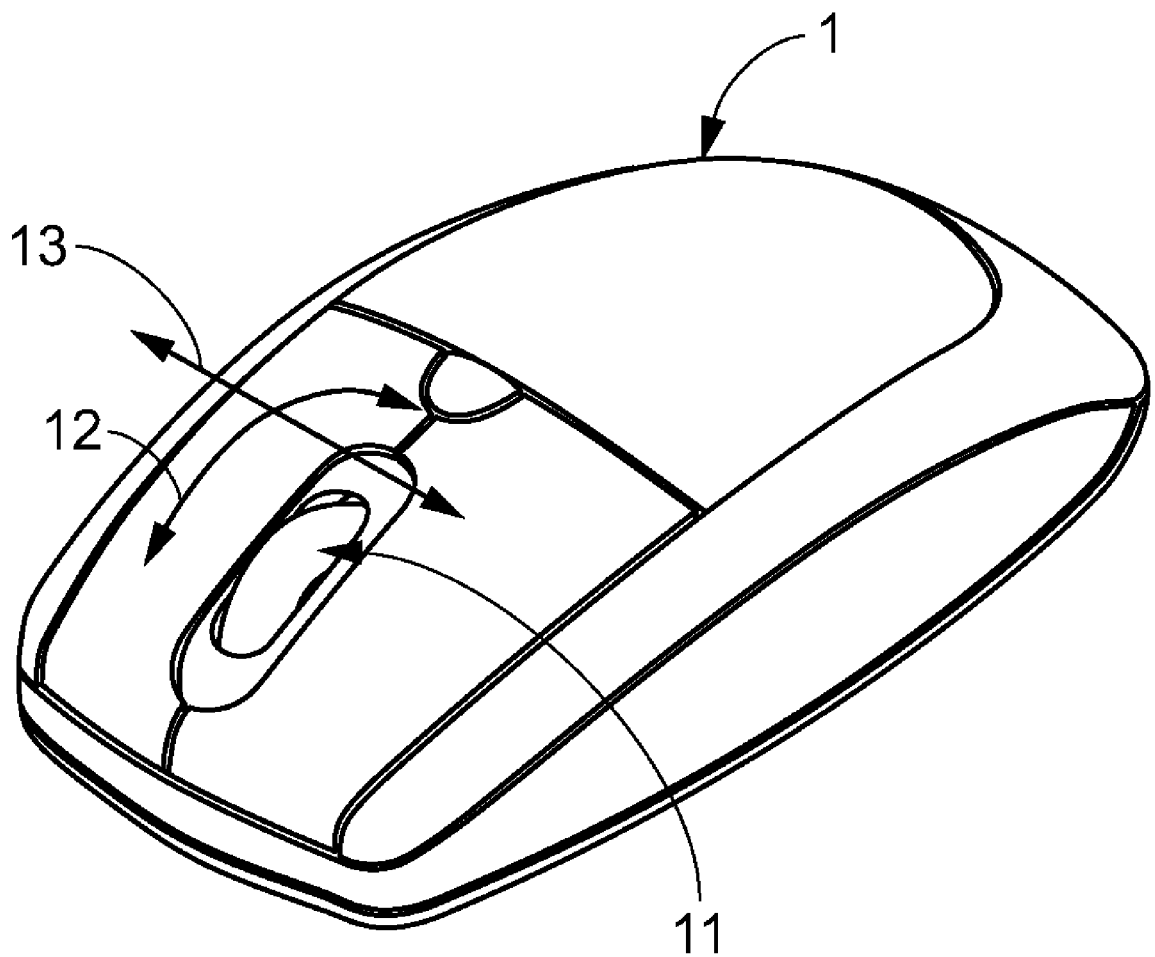
FIG. 1 is a schematic perspective view of a conventional tilt wheel type mouse.
Figure 2:
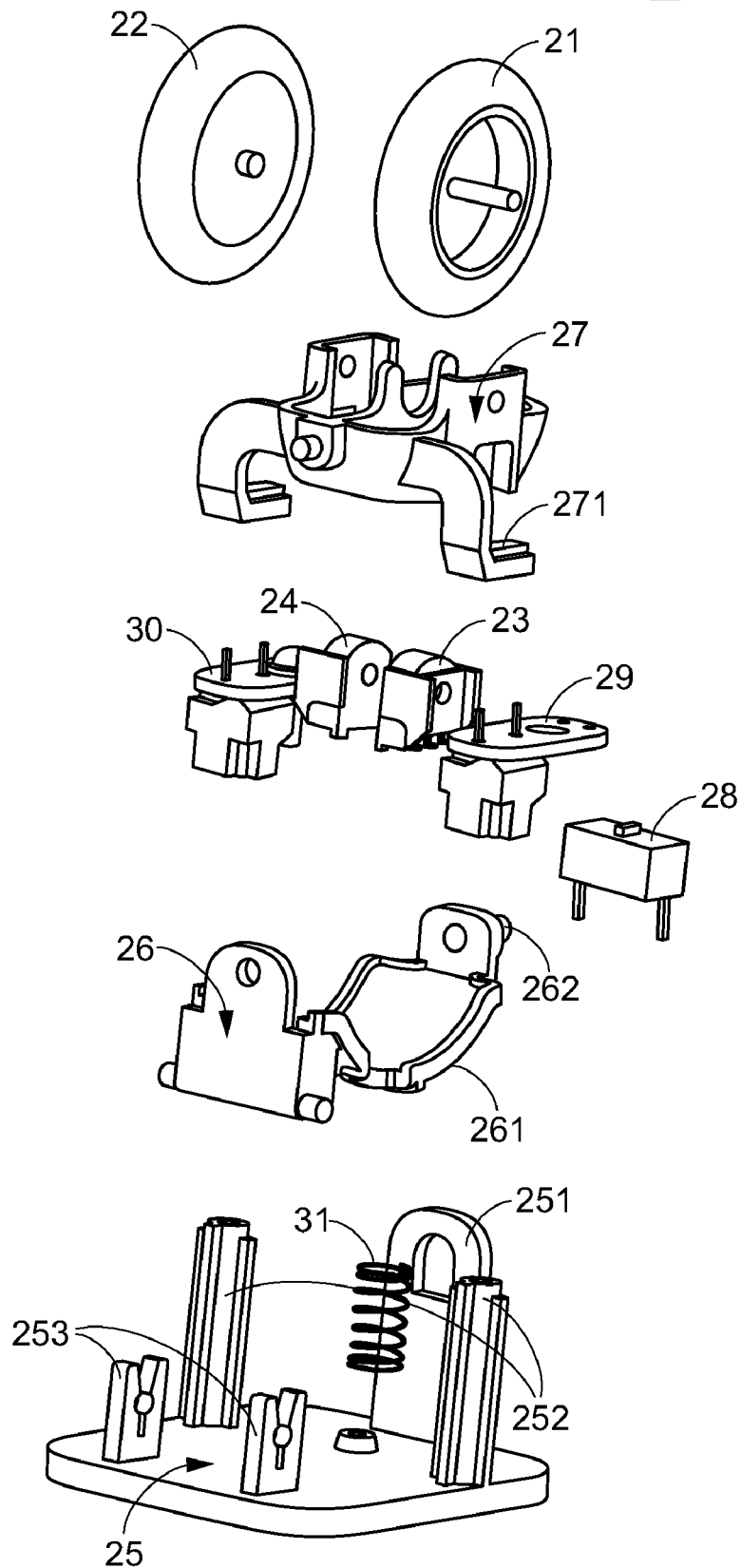
FIG. 2 is a schematic exploded view illustrating the internal components of a wheel mouse according to a preferred embodiment of the present invention.

FIG. 2 is a schematic exploded view illustrating the internal components of a wheel mouse according to a preferred embodiment of the present invention. In this embodiment, the wheel mouse 2 principally comprises a first scroll wheel 21, a second scroll wheel 22, a first encoder 23, a second encoder 24, a base 25, a supporting frame 26, a wheel swing seat 27, a spring 31 and a control unit (not shown). The base 25 comprises a gliding slot 251, pillars 252 and fixing elements 253. The supporting frame 26 comprises a triggering part 261 and a protrusion 262. The wheel swing seat 27 comprises triggering arms 271.

Figure 3:
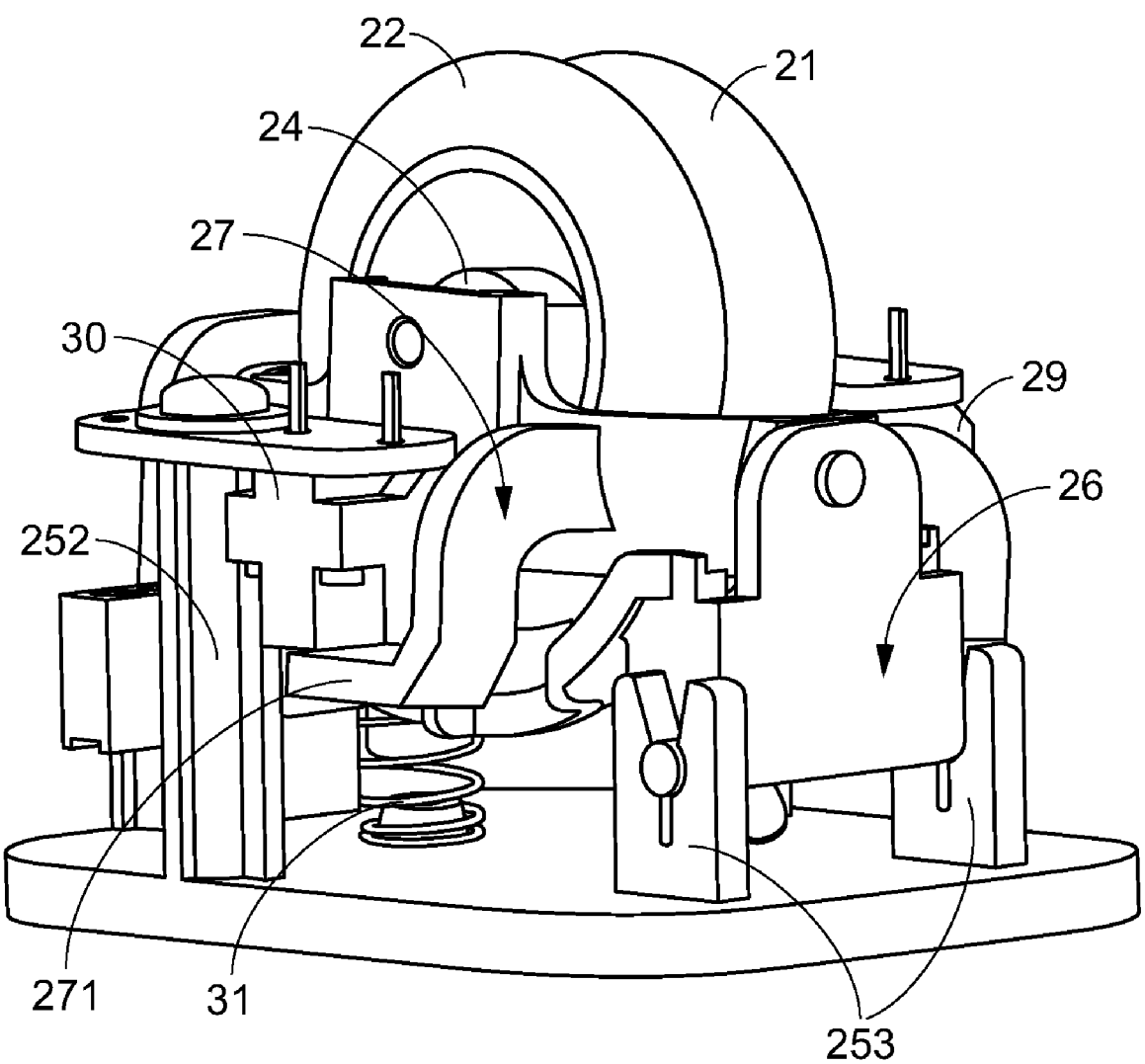
FIG. 3 is a schematic assembled view illustrating the internal components of the wheel mouse of FIG. 2.

FIG. 3 is a schematic assembled view illustrating the internal components of the wheel mouse of FIG. 2. Please refer to FIGS. 2 and 3. The supporting frame 26 is mounted on the base 25. The protrusion 262 of the supporting frame 26 is inserted into the gliding slot 251 of the base 25. The other end of the supporting frame 26 is connected to the fixing elements 253. After the supporting frame 26 is mounted on the base 25, the supporting frame 26 may be moved upwardly or downwardly along the gliding slot 251. In addition, a first switch 28 is mounted on the base 25. The spring 31 is arranged between the supporting frame 26 and the base 25. In a case that the first scroll wheel 21 and the second scroll wheel 22 are not pressed down, the spring 31 is sustained against the bottom of the supporting frame 26 but the triggering part 261 of the supporting frame 26 is not contacted with the first switch 28. Whereas, when the supporting frame 26 is pushed downwardly such that the triggering part 261 of the supporting frame 26 touches the first switch 28, a wheel triggering signal is generated. Furthermore, a second switch 29 and a third switch 30 are disposed on the two pillars 252 of the base 25, respectively. The second switch 29 and the third switch 30 are fixed on the pillars 252 by screwing means. The wheel swing seat 27 is disposed on the supporting frame 26. With the protrusion 262 of the supporting frame 26 serving as a rotating shaft, the wheel swing seat 27 can be swung after the wheel swing seat 27 is disposed on the supporting frame 26. When the wheel swing seat 27 is swung toward the left or right side, one of the triggering arms 271 will touch the second switch 29 or the third switch 30 on the pillars 252, and thus a corresponding tilt control signal is generated. The first encoder 23 is arranged within the first scroll wheel 21. In a case that the first scroll wheel 21 is rotated, the first encoder 23 generates a first rotation signal according to the rotating condition of the first scroll wheel 21. The second encoder 24 is arranged within the second scroll wheel 22. Likewise, in a case that the second scroll wheel 22 is rotated, the second encoder 24 generates a second rotation signal according to the rotating condition of the second scroll wheel 22. The first scroll wheel 21, the second scroll wheel 22, the first encoder 23 and the second encoder 24 are received in the receptacle of the supporting frame 26.

The control unit of the wheel mouse 2 is electrically connected to the first encoder 23 and the second encoder 24. In response to the first and second rotation signals, the control unit executes corresponding wheel functions. When the first rotation signal is received, the control unit executes a first wheel function. When the second rotation signal is received, the control unit executes a second wheel function. Moreover, when the first and second rotation signals are simultaneously generated by the first encoder 23 and the second encoder 24, respectively, the control unit executes a third wheel function. In this embodiment, the first function implemented by rotating the first scroll wheel 21 is a vertical scrolling function; the second function implemented by rotating the second scroll wheel 22 is a horizontal scrolling function; and the third function is a high-speed vertical scrolling function. On the other hand, when the first scroll wheel 21 or the second scroll wheel 22 is pressed down, the triggering part 261 of the supporting frame 26 touches the first switch 28 so as to generate a wheel depressing signal. In response to the wheel depressing signal, the control unit executes a fourth function. The fourth function is a normal-speed scrolling/high-speed scrolling switching function.

Figure 4A:
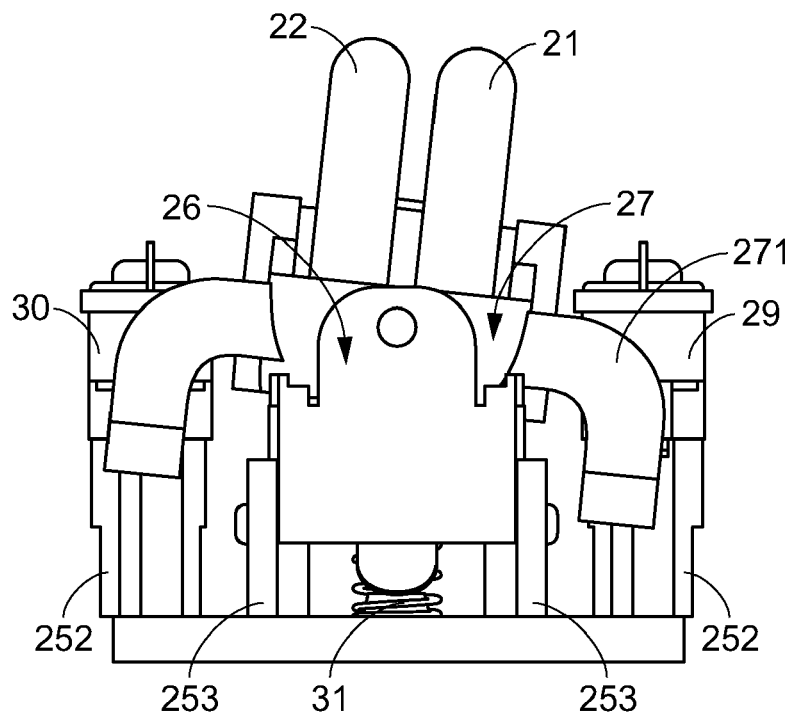
FIGS. 4A and 4B are schematic views illustrating the tilting actions of the wheel mouse of the present invention.
Figure 4B:
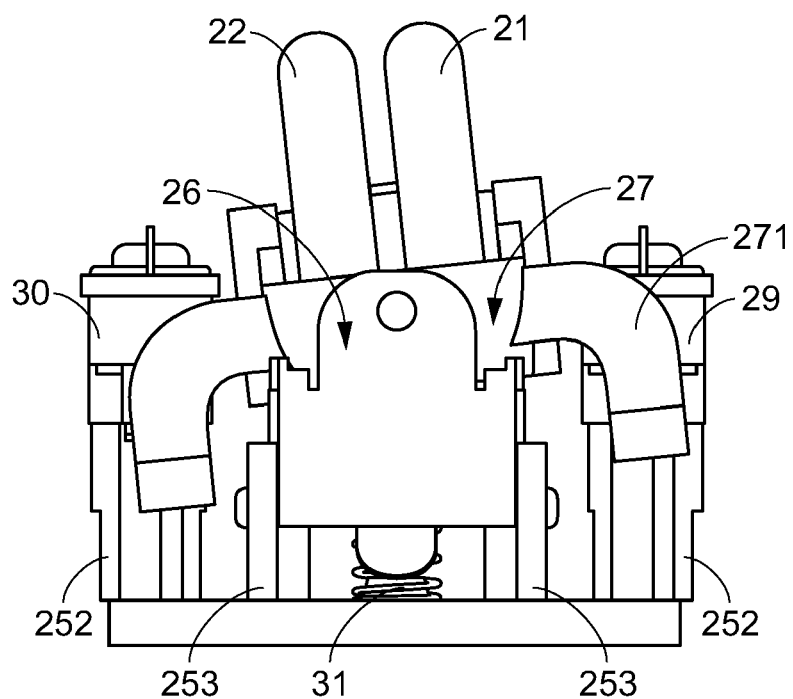

Hereinafter, the operations of executing the fifth and sixth functions of the wheel mouse will be illustrated with reference to FIGS. 4A and 4B. FIGS. 4A and 4B are schematic views illustrating the tilting actions of the wheel mouse of the present invention. When the user stirs the first scroll wheel 21 and the second scroll wheel 22 to the right side, the wheel swing seat 27 that receives the first scroll wheel 21 and the second scroll wheel 22 is tilted to the right side. Until the right triggering arm 271 of the wheel swing seat 27 touches the second switch 29, a right-side tilt control signal is generated. In response to the right-side tilt control signal, the control unit will execute the fifth function. When the user stirs the first scroll wheel 21 and the second scroll wheel 22 to the left side, the wheel swing seat 27 is tilted to the left side. Until the left triggering arm 271 of the wheel swing seat 27 touches the third switch 30, a left-side tilt control signal is generated. In response to the left-side tilt control signal, the control unit will execute the sixth function. As known, the conventional function of tilting the scroll wheel is a horizontal scrolling function. Since the horizontal scrolling function of the wheel mouse of the present invention is implemented by rotating the second scroll wheel 22, the fifth function of the present invention is a "Page Up" function. Moreover, the sixth function of the present invention is a "Page Down" function. In some embodiments, the fifth and sixth functions are designed as other common hot-key functions. For example, when the computer system is operated with Internet Explorer (IE) software, the fifth function a "Backward" function that is implemented to have the browsing page backward to the previous page; and the sixth function is a "Forward" function that is implemented to have the browsing page forward to the next page.

It is noted that, however, those skilled in the art will readily observe that numerous modifications and alterations may be made while retaining the teachings of the invention. That is, the first function is not restricted to the vertical scrolling function. Similarly, the other functions are not restricted to the above-mentioned functions.

In the above embodiments, it is found that the wheel mouse of the present invention has four additional operating modes when the second scroll wheel is added. These four additional operating modes include the forward rotation of the second scroll wheel, the backward rotation of the second scroll wheel, the simultaneous forward rotation of the first and second scroll wheels, and the simultaneous backward rotation of the first and second scroll wheels. According to the practical requirements, the wheel mouse can execute different functions at different operating modes. As known, the scroll wheel of a conventional wheel mouse is partially protruded through an opening in housing of the wheel mouse such that the scroll wheel can be manipulated by a user. For simplify the fabricating process, only the opening in the housing of the wheel mouse of the present invention needs to be widened such that these two scroll wheels can be partially protruded through this opening. In addition, there is a gap between the two scroll wheels of the wheel mouse. For ergonomic purpose, the finger of the user may be placed in the gap and thus the scroll wheels are skillfully manipulated.

Please refer to FIG. 3 again. The third switch 30 is fixed on the pillar 252. In particular, the third switch 30 is fixed on the pillar 252 in an upside-down form. In a case that the wheel swing seat 27 is tilted toward the left side, the triggering arm 271 of the wheel swing seat 27 may touch the third switch 30 so as to generate the tilt control signal. Since the triggering arm 271 of the wheel swing seat 27 fails to touch the third switch 30 when the first scroll wheel 21 or the second scroll wheel 22 is depressed down, the possibility of causing an erroneous operation is minimized. Like the third switch 30, the possibility of erroneously triggering the second switch 29 is minimized.

From the above description, since no additional mode is required to make a new housing, the wheel mouse of the present invention is cost-effective. The wheel mouse of the present invention has more hot-key function for increasing the operating convenience. In addition, the possibility of causing an erroneous operation is minimized by using the wheel mouse of the present invention.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A multi-function wheel mouse comprising:
    a first scroll wheel;
    a second scroll wheel;
    a first encoder disposed within said first scroll wheel and generating a first rotation signal according to the rotating condition of said first scroll wheel;
    a second encoder disposed within said second scroll wheel and generating a second rotation signal according to the rotating condition of said second scroll wheel; and a control unit electrically connected to said first encoder and said second encoder for executing a corresponding function in response to said first rotation signal and said second rotation signal, wherein said control unit executes a first function when only said first rotation signal is generated, said control unit executes a second function when only said second rotation signal is generated, and said control unit executes a third function when said first rotation signal and said second rotation signal are simultaneously generated, wherein said first and second functions are selected from a vertical scrolling function and a horizontal scrolling function and wherein said third function is a high-speed vertical or horizontal scrolling function.

2. The wheel mouse according to claim 1 further comprising:
a base comprising a gliding slot, a pillar and a fixing element;
a supporting frame mounted on said base, and comprising a triggering part; and
a wheel swing seat disposed on said supporting frame, wherein said first scroll wheel, said second scroll wheel, said first encoder and said second encoder are accommodated in said wheel swing seat.

3. The wheel mouse according to claim 2 further comprising a first switch arranged on said base, wherein when said supporting frame is pushed downwardly, said triggering part of said supporting frame touches said first switch to generate a wheel triggering signal, and said control unit executes a fourth function in response to said wheel triggering signal.

4. The wheel mouse according to claim 3 wherein said fourth function is a normal-speed scrolling/high-speed scrolling switching function.

5. The wheel mouse according to claim 3 further comprising a spring arranged between said supporting frame and said base, wherein if said first scroll wheel and said second scroll wheel are not pressed down, said spring is sustained against said supporting frame but said triggering part of said supporting frame is not contacted with said first switch.

6. The wheel mouse according to claim 2 wherein said supporting frame is fixed by said gliding slot and said fixing element of said base, and said supporting frame has a protrusion inserted into said gliding slot of said base such that said supporting frame is movable along said gliding slot.

7. The wheel mouse according to claim 2 further comprising a second switch disposed on said pillar of said base, wherein said second switch is screwed in said pillar.

8. The wheel mouse according to claim 7 wherein said wheel swing seat further comprises a triggering arm, a tilt control signal is generated when said second switch is touched by said triggering arm, and said control unit executes a fifth function in response to said tilt control signal.

9. The wheel mouse according to claim 8 wherein said fifth function is a "Page Up" function, or said fifth function is a "Backward" function under execution of Internet Explorer (IE) software.

10. The wheel mouse according to claim 2 further comprising a third switch disposed on said pillar of said base, wherein said third switch is screwed in said pillar.

11. The wheel mouse according to claim 10 wherein said wheel swing seat further comprises an additional triggering arm, an additional tilt control signal is generated when said third switch is touched by said additional triggering arm, and said control unit executes a sixth function in response to said additional tilt control signal.

12. The wheel mouse according to claim 11 wherein said sixth function is a "Page Down" function, or said sixth function is a "Forward" function under execution of Internet Explorer (IE) software.

13. The wheel mouse according to claim 1 wherein said first function is a vertical scrolling function, said second function is a horizontal scrolling function, and said third function is a high-speed vertical scrolling function.

14. The wheel mouse according to claim 1 wherein said first function is a horizontal scrolling function, said second function is a vertical scrolling function, and said third function is a high-speed horizontal scrolling function.

15. A multi-function wheel mouse comprising:
a first scroll wheel;
a second scroll wheel;
a first encoder disposed within said first scroll wheel and generating a first rotation signal according to the rotating condition of said first scroll wheel;
a second encoder disposed within said second scroll wheel and generating a second rotation signal according to the rotating condition of said second scroll wheel;
a base comprising a gliding slot, a pillar and a fixing element;
a supporting frame mounted on said base, and comprising a triggering part;
a wheel swing seat disposed on said supporting frame, wherein said first scroll wheel, said second scroll wheel, said first encoder and said second encoder are accommodated in said wheel swing seat; and
a control unit electrically connected to said first encoder and said second encoder for executing a corresponding function in response to said first rotation signal and said second rotation signal, wherein said control unit executes a vertical scrolling function when only said first rotation signal is generated, said control unit executes a horizontal scrolling function when only said second rotation signal is generated, and said control unit executes a high-speed vertical scrolling function when said first rotation signal and said second rotation signal are simultaneously generated.

16. The wheel mouse according to claim 15 further comprising a first switch arranged on said base, wherein when said supporting frame is pushed downwardly, said triggering part of said supporting frame touches said first switch to generate a wheel triggering signal, and said control unit executes a fourth function in response to said wheel triggering signal.

17. The wheel mouse according to claim 16 wherein said fourth function is a normal-speed scrolling/high-speed scrolling switching function.

18. The wheel mouse according to claim 16 further comprising a spring arranged between said supporting frame and said base, wherein if said first scroll wheel and said second scroll wheel are not pressed down, said spring is sustained against said supporting frame but said triggering part of said supporting frame is not contacted with said first switch.

19. The wheel mouse according to claim 15 wherein said supporting frame is fixed by said gliding slot and said fixing element of said base, and said supporting frame has a protrusion inserted into said gliding slot of said base such that said supporting frame is movable along said gliding slot.

20. The wheel mouse according to claim 15 further comprising a second switch disposed on said pillar of said base, wherein said second switch is screwed in said pillar.

21. The wheel mouse according to claim 20 wherein said wheel swing seat further comprises a triggering arm, a tilt control signal is generated when said second switch is touched by said triggering arm, and said control unit executes a fifth function in response to said tilt control signal.

22. The wheel mouse according to claim 21 wherein said fifth function is a "Page Up function", or said fifth function is a "Backward function" under execution of Internet Explorer (IE) software.

23. The wheel mouse according to claim 15 further comprising a third switch disposed on said pillar of said base, wherein said third switch is screwed in said pillar.

24. The wheel mouse according to claim 15 wherein said wheel swing seat further comprises an additional triggering arm, an additional tilt control signal is generated when said third switch is touched by said additional triggering arm, and said control unit executes a sixth function in response to said additional tilt control signal.

25. The wheel mouse according to claim 24 wherein said sixth function is a "Page Down" function, or said sixth function is a "Forward" function under execution of Internet Explorer (IE) software.

* * * * *